United States Patent
Mohr

(10) Patent No.: US 9,637,363 B2
(45) Date of Patent: May 2, 2017

(54) CONVEYOR FRAME

(71) Applicant: Christoph Mohr, Bielefeld (DE)

(72) Inventor: Christoph Mohr, Bielefeld (DE)

(*) Notice: Subject to any disclaimer, the term of this patent is extended or adjusted under 35 U.S.C. 154(b) by 0 days.

(21) Appl. No.: 14/778,125

(22) PCT Filed: Apr. 10, 2014

(86) PCT No.: PCT/EP2014/000962
§ 371 (c)(1),
(2) Date: Sep. 18, 2015

(87) PCT Pub. No.: WO2014/166634
PCT Pub. Date: Oct. 16, 2014

(65) Prior Publication Data
US 2016/0272473 A1   Sep. 22, 2016

(30) Foreign Application Priority Data
Apr. 10, 2013   (DE) ..................... 10 2013 006 129

(51) Int. Cl.
*B65G 43/00* (2006.01)
*B66F 7/06* (2006.01)
*B65G 35/06* (2006.01)

(52) U.S. Cl.
CPC .............. *B66F 7/065* (2013.01); *B65G 35/06* (2013.01)

(58) Field of Classification Search
CPC ................................................ B65G 49/0463
USPC ............. 198/346.3, 861.1, 435, 468.6, 468.8
See application file for complete search history.

(56) References Cited

U.S. PATENT DOCUMENTS

| | | | |
|---|---|---|---|
| 4,690,606 A | 9/1987 | Ross | |
| 6,857,493 B2* | 2/2005 | Shupp | B60T 7/16 180/168 |
| 2003/0047429 A1* | 3/2003 | Stewart | B62D 65/18 198/867.01 |
| 2003/0150657 A1 | 8/2003 | Shipp | |
| 2004/0054435 A1 | 3/2004 | Dehne | |
| 2008/0277173 A1 | 11/2008 | Midrouillet | |
| 2009/0091301 A1 | 4/2009 | Gandrud et al. | |

FOREIGN PATENT DOCUMENTS

| | | |
|---|---|---|
| DE | 102008050364 A1 | 9/2009 |
| DE | 102009034709 A1 | 2/2011 |
| WO | 2010/118737 A1 | 10/2010 |
| WO | 2012/051696 A1 | 4/2012 |

* cited by examiner

*Primary Examiner* — Gene Crawford
*Assistant Examiner* — Lester Rushin
(74) *Attorney, Agent, or Firm* — Laurence P. Colton; Smith Tempel Blaha LLC

(57) ABSTRACT

A conveyor frame for a conveyor system, having a lifting table, particularly a scissor-lift table, and a storage device for electrical energy for supplying an electrical lifting table drive for raising and/or lowering the lifting table, in which the maximum electrical power consumption of the lifting table is greater than the maximum electrical power consumption of all other electrical devices of the conveyor frame supplied by the storage device.

20 Claims, 4 Drawing Sheets

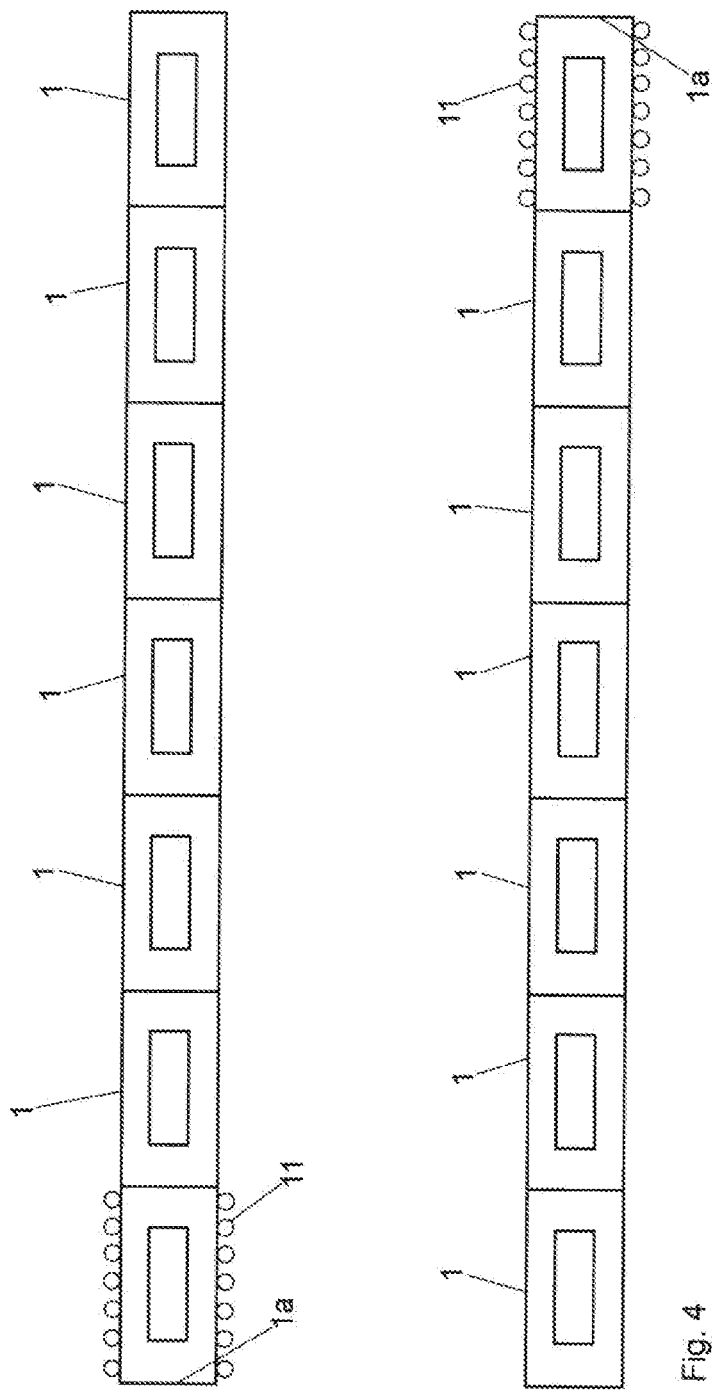

CONVEYOR FRAME

STATEMENT OF RELATED APPLICATIONS

This application is the US National Phase of International Application No. PCT/EP2014/00962 having an international filing date of 10 Apr. 2014, which claims priority on and the benefit of German Patent Application No. 102013006129.6 having a filing date of 10 Apr. 2013 and International Application No. PCT/EP2013/001094 having an international filing date of 15 Apr. 2013.

BACKGROUND OF THE INVENTION

Technical Field

The invention relates to a conveying frame for a conveyor system, to a conveyor system, and to a method for operating a conveyor system.

Prior Art

Conveyor systems are used in manufacturing, in which conveying frames are transported along a conveying segment, and the actual goods to be conveyed are accommodated on these conveying frames. Frequently the case exists that the goods to be conveyed must be accessible at various points of the conveying segment at differing heights, for example when assembly work must be carried out. For this purpose, the conveying frames often comprise lift tables or are designed as lift tables.

The lift tables include an electromechanical drive, which allows the goods being conveyed to be raised or lowered. Electromechanical drives shall be understood to mean drive systems that are driven by an electric motor, which is mechanically coupled to the lift table.

Different types of conveying frames are known; for example, the automotive industry refers to these in particular as skids. Hereafter, the term 'conveying frame' also refers to skids that comprise a lift table. In this connection, 'conveying frame' shall also refer to what are known as lift suspension fixtures, in which the actual lift table is integrated in a conveying frame designed as a suspension rack, which is transported suspended on a rail construction.

The conveying frames are transported in the conveyor system either on conveyor belts; however, at times rail systems, chain conveyors, and friction roller drives or the like are also used.

All these systems have in common that a power supply system must be present to supply the lift table with electrical energy so as to enable operation of the lift table. The related art essentially teaches two solutions in this regard, which are the supply via collectors and conductor lines on the one hand, and contactless energy transmission by inductive coupling on the other hand.

Power supply is complex since it has to be designed in such a way that the theoretically possible simultaneous operation of the lift tables is a load that can be managed.

In practice, the raising and lowering processes account for only a fraction of the operating time, which is to say, the overall power supply is generally not utilized the majority of the time.

Even though the utilization of the power supply systems is minimal, the costs for these often account for 25% to 35% of the overall costs of such a system.

US 2004/0054435 A1 discloses a conveyor system in which the conveying frames each have a dedicated conveyor drive assembly that is powered by a rechargeable battery. The conveying frames can move independently through the conveyor system as a result of this drive assembly. The conveyor drive assemblies of the individual conveying frames are supplied with energy by rechargeable batteries, which are an integral part of the conveying frames. Such conveyor systems make it possible to supply the power supply system of the lift drives for lift tables likewise with electrical energy from the rechargeable batteries that are provided for operating the conveyor drive assemblies of the individual conveying frames. This is possible since the maximum electrical power consumption of the lift drive of a lift table is lower than the maximum electrical power consumption for which the rechargeable batteries must be designed in such conveying frames to cover the demand for electrical energy of the conveyor drive assemblies. However, the disadvantage of such a system is that it is necessary to install rechargeable batteries having accordingly high capacities in the conveying frames, so as to supply sufficient electrical power for the conveyor drive assembly. This likewise results in high costs, which is why such systems offer no advantage, or at least no noteworthy advantage, from a cost perspective over the above-described systems, in which the conveying frames do not comprise a dedicated conveyor drive, but are moved solely by stationary conveying devices.

BRIEF SUMMARY OF THE INVENTION

It is therefore the object of the invention to create a conveying frame for a conveyor system, a conveyor system, and a method for operating a conveyor system, in which the costs for the power supply for the lift drives of the lift tables are reduced.

The object is achieved by a conveying frame, a conveyor system, and a method for operating a conveyor system having the features of the independent claims. The dependent claims relate to advantageous embodiments.

The conveying frames according to the invention comprise a storage device for electrical energy so as to supply the lift drive for raising and/or lowering the lift table. According to the invention, the maximum electrical power consumption of the lift drive is greater than the maximum electrical power consumption of all other electrical devices of the conveying frame supplied by the storage device. The electrical devices also include further drives that are not used to raise or lower the lift table.

Compared to the cited related art, these lift tables have the advantage that the storage device for electrical energy is considerably smaller, and can thus be designed significantly less expensively, than is known in the prior art, since the largest electrical power consumer is the lift drive of the lift table.

By using the storage device, it is possible to supply the electrical lift drive with energy at any time, without this necessitating a connection of the conveying frame to a power supply device of the type described above. To this end, it applies that the replacement of a conventional power supply of the conveying frames with a decentralized power supply according to the invention by way of storage devices is all the more worthwhile with respect to the costs, the less frequently the lift drive is used to raise or lower the lift table during operation of the conveyor system. It is possible to consider the requirements with regard to the storage devices to be used resulting from the planned use of the conveying frame when selecting these storage devices, which is to say, for example, a lead acid or lithium battery can be specifically selected as a function of the power consumption of the lift drive, the number of cycles to be expected, and the frequency and duration of potential load cycles.

The maximum electrical power consumption of the lift table drive is preferably at least twice, preferably four times, as high as the maximum electrical power consumption of all other devices of the conveying frame supplied by the storage device. Since the lift drives in such conveyor systems are operated for only a fraction of the operating duration of the conveyor system, which is preferably no more than 10 min/hr, and more preferably no more than 5 min/hr, the cost savings that the present invention makes possible increase the higher the share of the maximum electric power consumption of the lift drive is in the maximum electric power consumption of all electrical devices of the conveying frame supplied by the storage device.

According to the method according to the invention, this means that the predominant portion of electrical energy delivered by the storage device for raising and/or lowering the table is delivered to the lift drive. Only a smaller portion of the energy is used to operate the remaining electrical consumers supplied by the storage device. The delivered electrical energy or the share thereof is calculated as an average value, which is averaged across the operating duration during which the system is operated in the intended operation. This means that in particular downtimes due to maintenance or production shutdowns, for example over the weekend, are not included in the operating duration within the meaning of the present invention. During the times that are not included in the operating duration within this meaning, it may be possible for other consumers, for example as part of a stand-by operation, to exceed the power consumption of the lift drives during these times, since the lift drives, by nature, are not being operated during such times.

By virtue of the power of the lift drives that is typically needed in such systems, it was surprisingly found that the cost savings achievable by the present invention are particularly high when the electrical power delivered by the storage device exceeds 2000 W, preferably 1000 W, only during a certain portion of the operating duration. This portion is preferably no more than 10 min/hr, and more preferably no more than 5 min/hr. It is further advantageous that the electrical power delivered by the storage device exceeds a value of 50%, and preferably of 20%, of the maximum power consumption of the lift drive only during this portion of the operating duration. The power supply of a system according to the invention can be designed particularly cost-effectively when such a distribution of the load peaks takes place.

The storage device preferably comprises a rechargeable battery, which is to say an electrochemically based rechargeable storage device for electrical energy. It has been shown that the cost savings are particularly high when the rechargeable battery has a capacity of at least 10 and/or no more than 50 Ah. As an alternative or in addition, the storage device can also comprise a capacitor, in which the electrical energy is stored in an electric field. The capacitance of such a capacitor is then preferably at least 1 farad, more preferably at least 10 farad, and in particular at least 100 farad. Capacitor capacitances of this magnitude make it possible to store sufficiently large amounts of energy to advantageously implement the present invention.

The conveying frame advantageously comprises an energy recovery device, which converts potential mechanical energy into electrical energy when the lift table is lowered and stores the same in the battery.

The recovery device may concern the use of the lift drive that is necessary anyhow, which is electrically interconnected to the storage device in such a way that energy recovery is thereby possible when the lift table is lowered.

In this way, energy that is regularly lost in conventional systems can be utilized. The frequency or duration of the load cycles of the storage devices is thereby reduced, and the energy costs of the system are reduced in general.

The conveying frame preferably comprises means for connecting the conveying frame to a charging device for charging the storage device. So as to minimize idle periods of the conveying frame due to charging, it is advantageous to provide such means that make it possible to keep the idle periods of the conveying frame for the purpose of connecting the same to a charging device as short as possible or entirely avoid them. It is possible, for example, to provide easily reachable plug connections, which allow fast coupling of the conveying frame to an electrical supply line; however, it is more advantageous if the means are designed in such a way that they allow the storage device to be charged during ongoing operation. The conveying frame may comprise sliding contacts, for example, which allow the storage device to be charged even while the conveying frame is moved in the conveyor system.

However, advantageously it is also possible for the conveying frame to comprise means for inductive coupling to a charging device which enable contactless charging of the storage device.

The conveyor system advantageously includes a charging device, which is likewise designed in such a way that charging of the storage device during transport of the conveying frames is possible. This may likewise involve mating sliding contacts or means for inductively coupling the storage device to the charging device of the conveyor system. However, plug connections are also possible, which are temporarily established via a sub-section of the conveyor segment as the conveying frame is transported. This is possible when the element of the plug connection on the charging device side can be carried with the conveying frame across a section of the conveyor segment of the conveyor system, for example when the conveyor system is designed such that the same has a return segment for conveying frames no loaded with goods to be conveyed. This design lends itself to carrying out the charging of the storage device on the return segment, since the charging device cannot conflict with the conveying process, and with production processes associated therewith, for example because provided contact elements prevent work on the goods to be conveyed.

Especially in conveying systems in which the lift tables must carry out only very few lifting processes per unit of time, it may be expedient to design the conveying frames and/or the conveying device in such a way that it is possible to replace the storage device without interrupting the conveying operation, which is to say during transport of the conveying frame. It is then possible to replace a spent, which is to say a dead or a discharged, storage device with a charged one on a section of the conveyor segment on which no raising of the lift table takes place.

It is advantageous when the conveyor system comprises a replacing device for this purpose for replacing the storage device of the conveying frame, preferably an automated replacing device, which is to say a device that is designed so as to be able to carry out a replacement of the storage device on a conveying frame passing the replacing device, without human intervention.

The storage devices can then be charged externally, which is to say independently of the ongoing conveying operation, on such a conveyor system. This has the advantage that the devices needed for charging the storage devices can be designed independently of the conveying operation, whereby it is possible to design these considerably more simply than is the case, for example, in the above-described charging devices for charging the battery during conveying operation.

In particular when the conveyor system already comprises an access station for the inward or outward transfer of conveying frames into or out of the conveyor system, but also in other cases, it may be expedient for the conveyor system to comprise an access station for the inward and/or outward transfer of the conveying frame for replacing the storage device and/or for charging the storage device.

In this design of a conveyor system according to the invention, it possible to inwardly or outwardly transfer entire conveying frames. It is then possible for the storage devices to remain outside the conveyor system in the conveying frames for charging, or it is possible to carry out a manual replacement outside the conveyor system, for which no complex replacing device is needed, since the replacement of the storage device does not impede the conveyor system.

It is moreover advantageous if the conveying frame has an energy generation device, which is designed so as to be able to generate electrical energy based on the conveying motion of the conveying frames and thereby power the battery. For example, it is conceivable to provide a dynamo, which is driven by the conveying motion via a suitable mechanical coupling to the surrounding area of the conveying frame, which may result along the entire conveyor segment or a portion of the conveyor segment. Friction wheels or rollers that interact with the conveyor system are conceivable.

Such a mechanical coupling can be implemented considerably more easily and cost-effectively than an electrical coupling by way of sliding contacts, induction loops or the like, and can likewise be used to feed electrical energy to the storage device.

It may furthermore be advantageous if the drive comprises a first electric motor that is powered from the storage device, and a second electric motor that is powered by a power supply system of the conveyor system, bypassing the storage device. Such a variant is interesting in particular for retrofitting existing conveyor systems. When such a system is expanded and the existing power supply is no longer sufficient to adequately supply the conveying frames with power, in this way the further electric motor, which is powered from the storage device, can relieve from the existing motors, whereby the power consumption of the same decreases and thus the existing power supply is sufficient. Providing two electric motors is expedient in particular since differing motors can be used, which can be matched to the differing properties of the electrical energy that is made available, such as voltage, current intensity, direct or alternating current. Such a hybrid system can also prove to be superior to a purely storage device-based and a purely conventional power supply concept for the conveying frames within the scope of a cost optimization, since the cost function exhibits linear behavior as a function of the power output of the lift drive of the lift table only in extremely rare cases. Moreover, design boundary conditions may limit the capacities of the storage devices, for example, or individual load peaks may be prompted only at very certain segment sections on a regular basis, depending on the individual conveyor system, so that in these isolated cases such a combined system represents the most cost-effective solution.

Moreover, when designing the conveyor system, it may be advantageous to design the time period that is available for charging the storage devices during intended operation to be greater than the time period during which electrical energy is withdrawn from the storage devices during intended operation. In this way, lower current intensities are needed for charging the storage devices than are needed for operating the lift drives. The electrical energy is essentially buffered.

Correspondingly, it may be advantageous to design the conveyor system, and more particularly the electrical components, so that the electrical power that can be transmitted for charging the storage device is lower than the electrical power needed for operating the drive. In this way, considerably less expensive components can be used, in particular in the case where the storage devices are charged during operation of the system.

This applies in particular to inductive energy transmission systems, since in these the costs can rise disproportionately with the power that is to be transmitted.

However, in particular when the storage device comprises a rechargeable battery and a capacitor, a short charging time may also be desirable, since the conveying frames or the storage devices then have to be connected to a power supply device only for a relatively short time. It is particularly advantageous in this connection when electrical energy for charging the storage device is initially buffered in a capacitor, and subsequently delivered from the capacitor to a rechargeable battery and stored in the rechargeable battery. Likewise or in addition, it may be advantageous to operate a rechargeable battery and a capacitor in parallel in the storage device. In this way, it is possible to combine the advantages of the capacitor, these being the ability to take up and deliver high electrical power and consequently short charging times, with the advantages of the rechargeable battery, these being the possibility to storage relatively large amounts of energy at low voltages.

BRIEF DESCRIPTION OF THE DRAWINGS

FIG. 4 shows a schematic representation of an exemplary conveyor system according to the invention, designed as a skillet system.

DETAILED DESCRIPTION OF PREFERRED EMBODIMENTS

Figure 1:
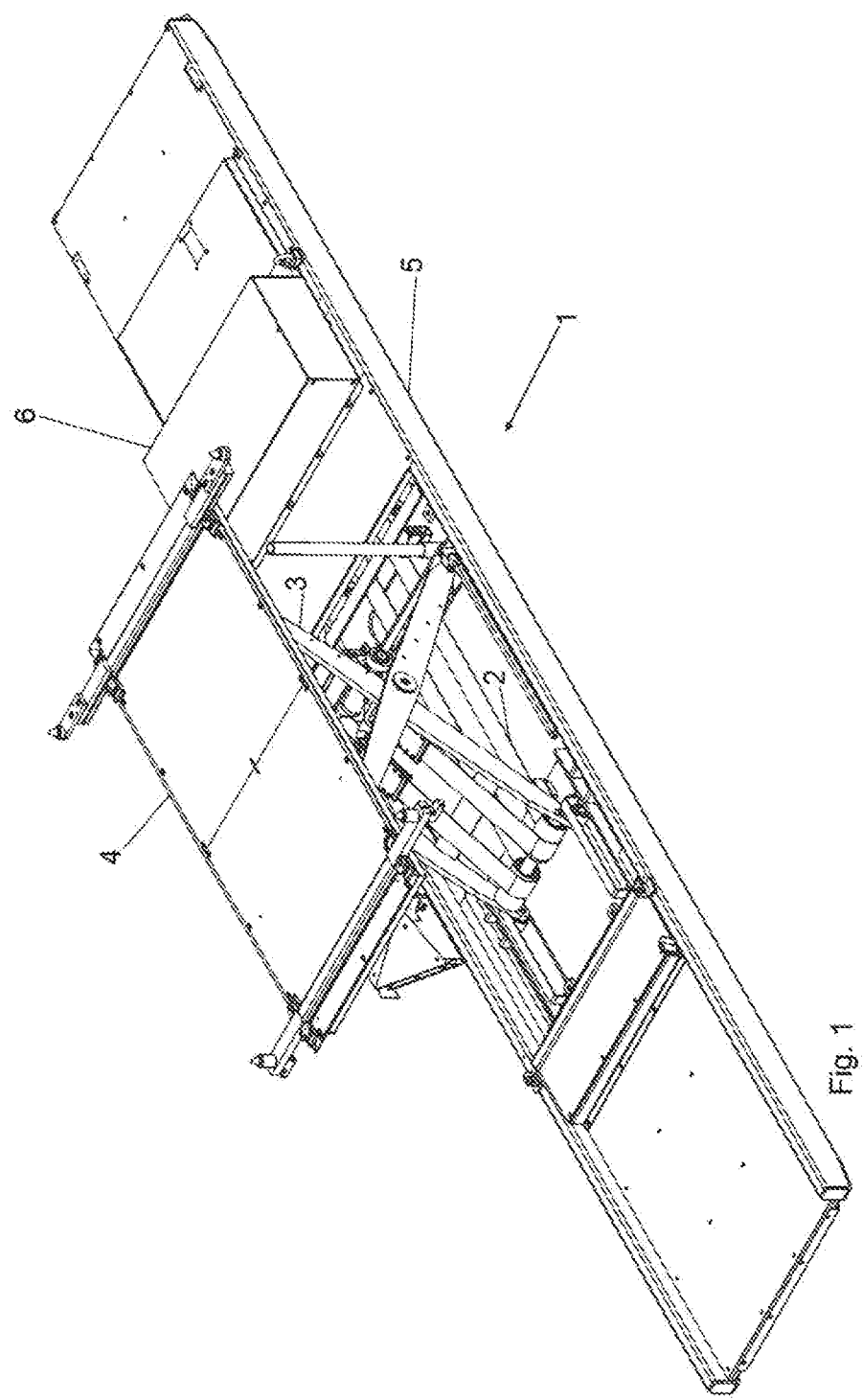
FIG. 1 shows a schematic representation of an exemplary conveying frame according to the invention.

The conveying frame 1 according to the invention shown in FIG. 1, designed as a lift table, comprises a bottom basic frame element 5, which is connected to an upper frame element 4 by way of a scissor mechanism 3. The scissor mechanism 3 is used in such a lift table, which is also referred to as a scissor lift table, to make the lifting motion possible, and the load to be lifted is absorbed by the upper frame element 4.

The lifting motion of the scissor mechanism 3 is effectuated by way of belts 2, which are coupled to a lift drive accommodated in a drive housing 6. This drive generally comprises a shaft, onto which the belts 2 are wound and which, in turn, is driven by an electric motor.

Figure 2:
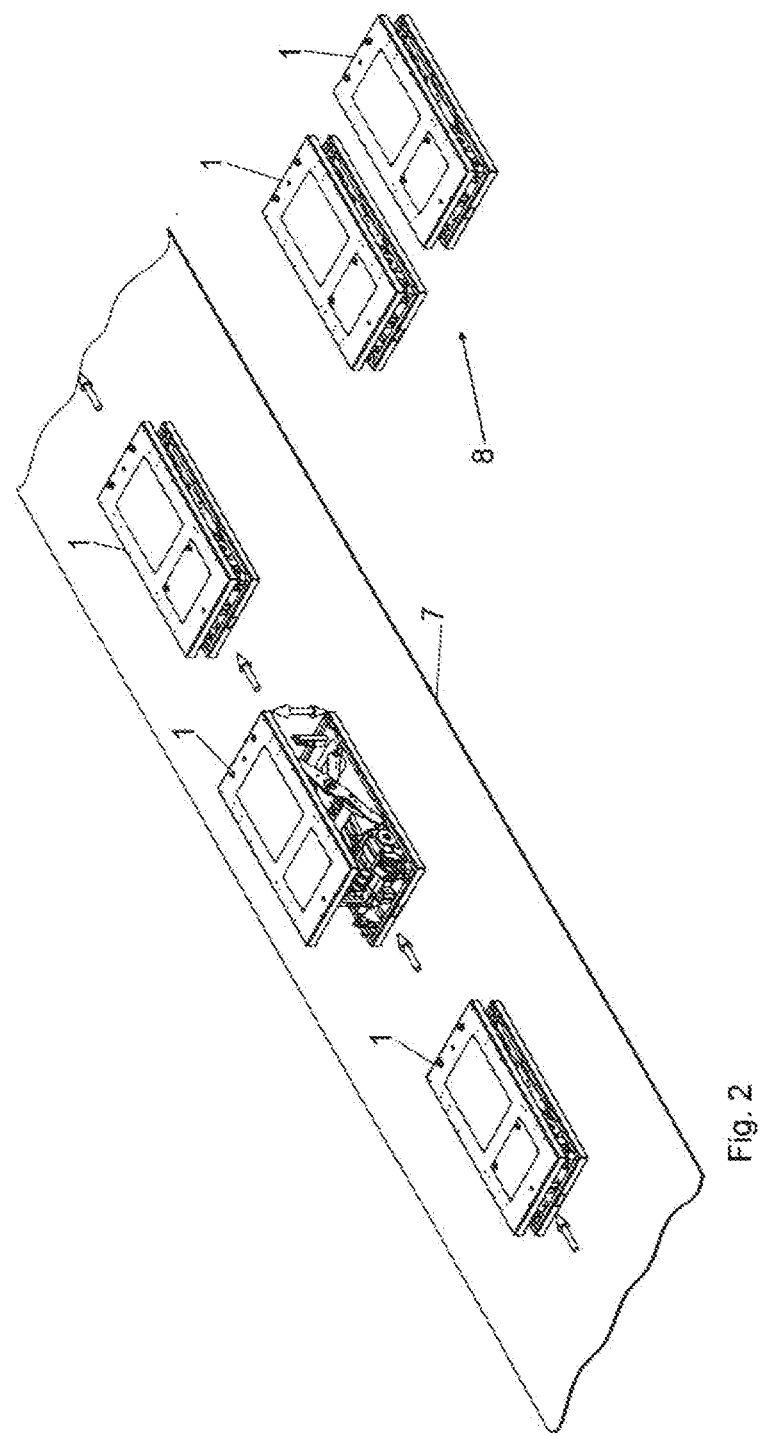
FIG. 2 shows a schematic representation of an exemplary conveyor system according to the invention.

FIG. 2 shows an exemplary option for a conveying device in which the conveying frames 1 are transported on a slat conveyor 7. The storage devices can be charged in one of the described manners during the transport on the slat conveyor 7; alternatively, the storage devices of the conveying frames 1 can be charged by a stationary charging station, which is not shown, while the conveying frames 1 are located at a temporary storage site 8.

Figure 3:
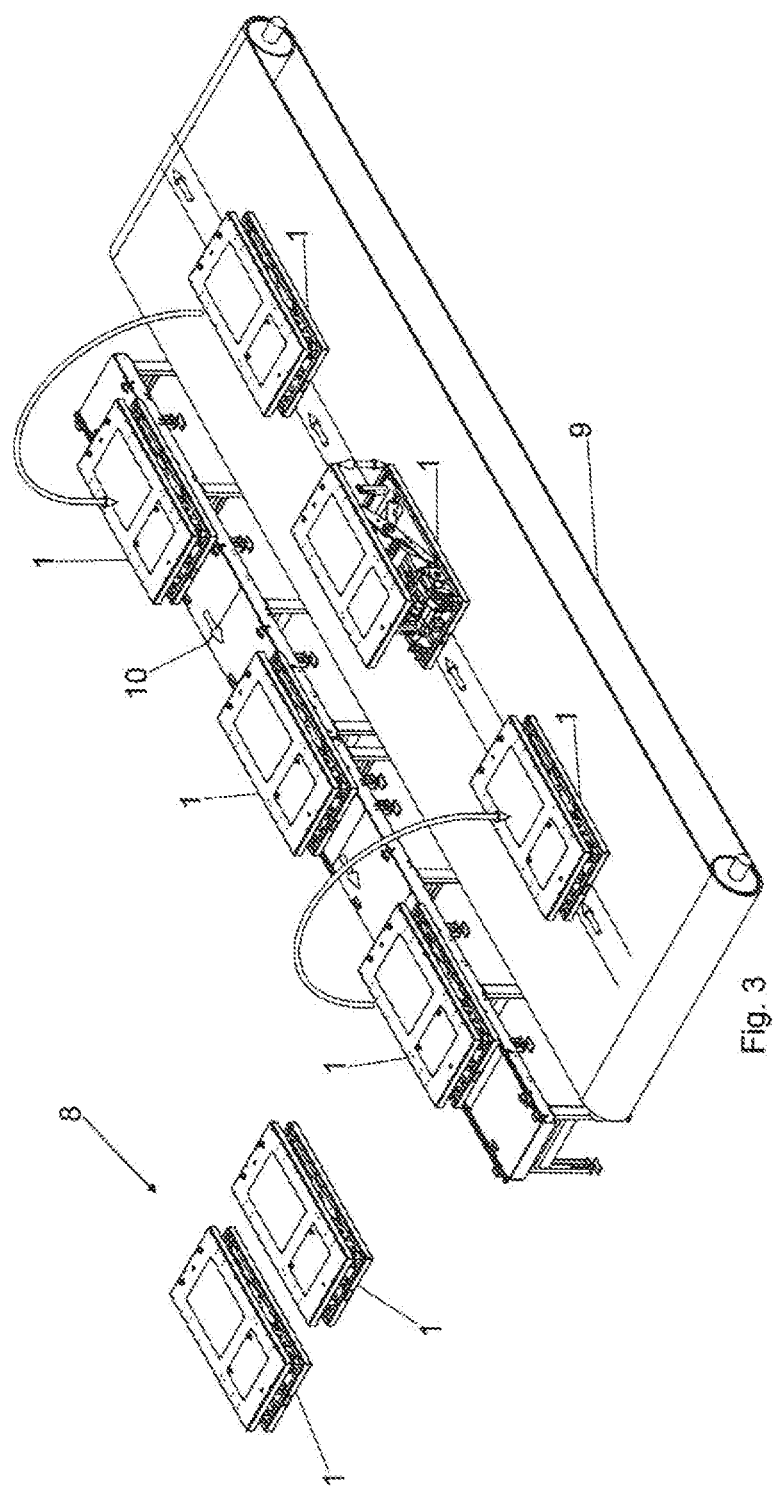
FIG. 3 shows a schematic representation of an exemplary conveyor system according to the invention according to a further exemplary embodiment.

FIG. 3 shows a further example of a conveyor system according to the invention.

In this example, the conveying frames 1 are transported on a traditional conveyor belt 9. The conveyor belt is oversized in the example shown, so that it is possible to carry out work on the conveyor belt at the loads accommodated on the lift tables of the conveying frames 1 during transport. So as to be able to continuously guide the conveying frames 1 in a circuit, the exemplary conveyor system shown in FIG. 3 comprises a return segment 10.

By way of transfer devices, which are not shown, the conveying frames 1 are transferred from the conveyor belt 9 to the return segment 10 and from the return segment 10 onto the conveyor belt 9. Such a system can additionally also comprise a temporary storage site 8.

FIG. 4 schematically illustrates the operating principle of an exemplary conveyor system according to the invention in the form of a skillet conveyor system. Preferably, a stationary conveying device drives the lift tables 1 designed as skillets, for example by way of friction rollers 11, in that the lift tables 1 are arranged consecutively in a row, and the lift tables 1a, which are engaged with the conveying device, push the remaining conveying frames 1. In a particularly advantageous manner, it is again possible in this example to create a conveyor system in which the conveying frames 1 are guided in a circuit, when two conveying sections rotating in opposite directions are used.

What is claimed is:

1. A conveyor system comprising at least one conveying frame, the conveying frame being transportable through the conveyor system, the conveyor system configured as a skid and/or skillet conveyor system, the conveying frame comprising a lift table, in particular a scissor lift table, and a storage device for electrical energy for supplying an electrical lift table drive for raising and/or lowering the lift table, the conveying frame also comprising an energy recovery device for charging the storage device when the lift table is lowered,
wherein
the maximum electrical power consumption of the lift table drive is greater than the maximum electrical power consumption of all other electrical devices of the conveying frame supplied by the storage device.

2. The conveying frame according to claim 1,
wherein
the maximum electrical power consumption of the lift table drive is at least twice as high as the maximum electrical power consumption of all other electrical devices of the conveying frame supplied by the storage device.

3. The conveying frame according to claim 1,
wherein
the storage device comprises a rechargeable battery having a capacity of at least 10 Ah and/or no more than 50 Ah.

4. The conveying frame according to claim 1,
wherein
the storage device comprises a capacitor selected from the group of capacitors having a capacitance of at least 1 farad, having a capacitance of at least 10 farad, and having a capacitance of at least 100 farad.

5. The conveyor system according to claim 1,
wherein
the conveyor system is designed in such a way that the conveying frames are transportable through the conveyor system without a dedicated conveyor drive.

6. A method for operating a conveyor system according to claim 1, comprising:
transporting at least one conveying frame through the conveyor system, the conveying frame comprising a lift table;
raising and/or lowering the lift table;
storing in electrical energy for supplying the lift drive; and
delivering electrical energy to the lift drive,
wherein
the predominant portion of electrical energy delivered by the storage device for raising and/or lowering the lift table is delivered to the lift drive.

7. The method according to claim 6,
wherein
the electrical power delivered by the storage device exceeds a value of 50% of the maximum power consumption of the lift drive only during a portion of the operating duration of the conveyor system of no more than 10 min/hr.

8. The method according to claim 6,
wherein
the electrical power delivered by the storage device exceeds a value of 2000 watt only during a portion of the operating duration of the conveyor system of no more than 10 min/hr.

9. The method according to claim 6,
wherein
the lift drive is used only during a portion of the operating duration of the conveyor system of no more than 10 min/hr for raising and/or lowering the lift table.

10. The method according to claim 6,
wherein
electrical energy for charging the storage device is buffered in a capacitor, and subsequently delivered from the capacitor to a rechargeable battery and stored in the rechargeable battery.

11. The method according to claim 6,
wherein
electrical energy is produced when the lift table is lowered and stored in the storage device.

12. The method according to claim 6,
wherein
the conveying frame is transported through the conveyor system with a dedicated drive through the conveyor system.

13. The method according to claim 6,
wherein
the transport of the conveying frame takes place only by way of at least one stationary conveying device.

14. The conveying frame according to claim 1, wherein the maximum electrical power consumption of the lift table drive is at least four times as high as the maximum electrical power consumption of all other electrical devices of the conveying frame supplied by the storage device.

15. The conveying frame according to claim 14, wherein the conveying frame comprises an energy recovery device for charging the storage device when the lift table is lowered.

16. The conveying frame according to claim 14, wherein the storage device comprises a rechargeable battery having a capacity of at least 10 Ah and/or no more than 50 Ah.

17. The conveying frame according to claim 14, wherein the storage device comprises a capacitor selected from the group of capacitors having a capacitance of at least 1 farad, having a capacitance of at least 10 farad, and having a capacitance of at least 100 farad.

18. The method according to claim 6, wherein
the electrical power delivered by the storage device exceeds a value of 20% of the maximum power consumption of the lift drive only during a portion of the operating duration of the conveyor system of no more than 5 min/hr.

19. The method according to claim 6, wherein
the electrical power delivered by the storage device exceeds a value of 1000 watt only during a portion of the operating duration of the conveyor system of no more than 5 min/hr.

20. The method according to claim 6, wherein
the lift drive is used only during a portion of the operating duration of the conveyor system of no more than 5 min/hr for raising and/or lowering the lift table.

* * * * *